Jan. 30, 1923.　　　　　　　　　　　　　　　　　1,443,537
J. HORTVET.
APPARATUS FOR DETERMINING THE FREEZING POINT OF MILK.
FILED SEPT. 9, 1919.
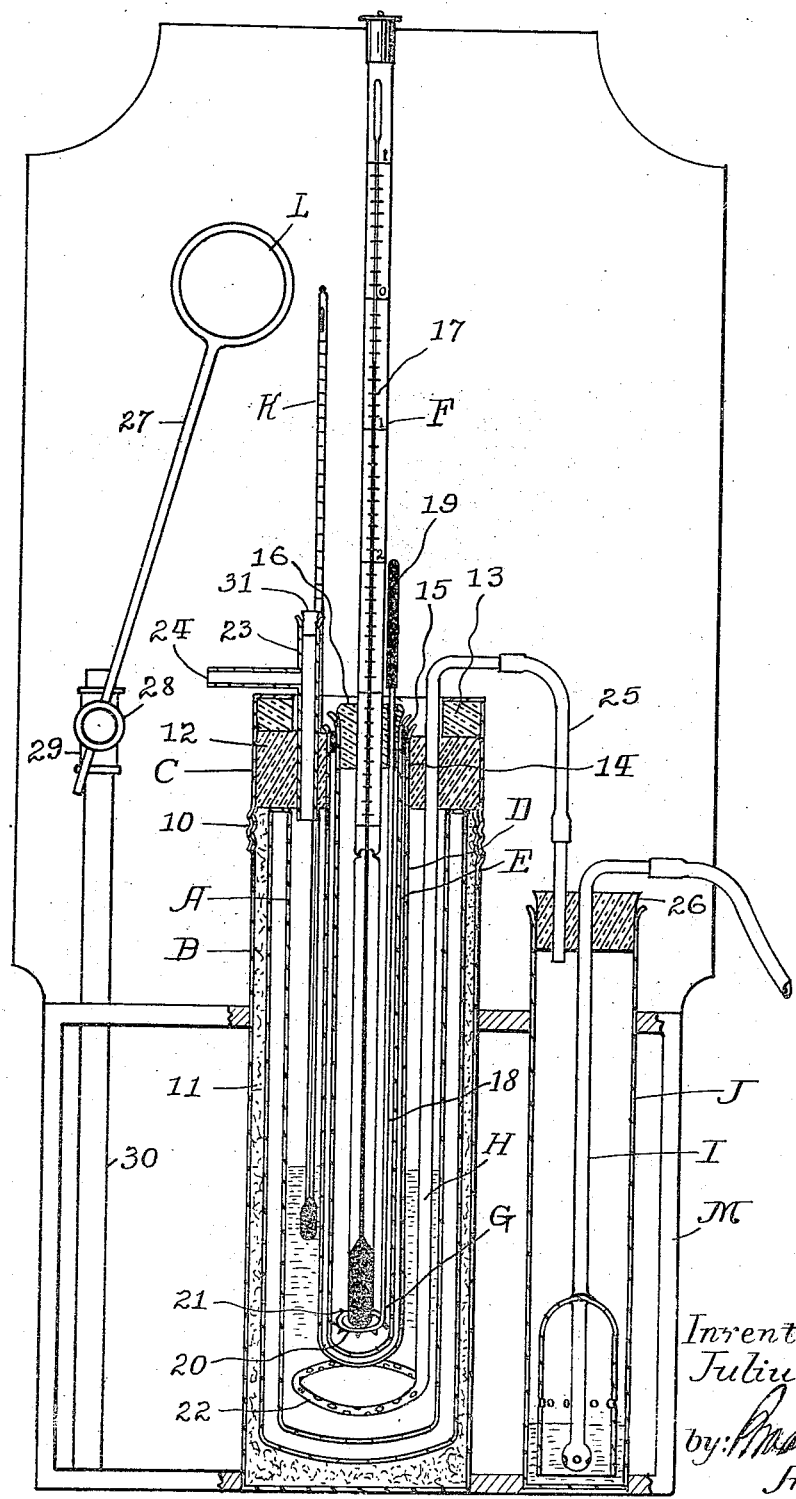
Inventor:
Julius Hortvet
by: [signature]
Attorneys Patented Jan. 30, 1923.

1,443,537

UNITED STATES PATENT OFFICE.

JULIUS HORTVET, OF ST. PAUL, MINNESOTA.

APPARATUS FOR DETERMINING THE FREEZING POINT OF MILK.

Application filed September 9, 1919. Serial No. 322,631.

*To all whom it may concern:*

Be it known that I, JULIUS HORTVET, a citizen of the United States, residing at St. Paul, in the county of Ramsey and State of Minnesota, have invented new and useful Improvements in Apparatus for Determining the Freezing Point of Milk, of which the following is a specification.

For many years past there has been an urgent demand for a simple and effective means chiefly for the purpose of making rapid freezing point determinations on market milk samples which are taken up in large numbers by inspectors especially in large cities. The value of freezing point determinations on samples of milk has been demonstrated by laboratories and the reliability of such a determination as a means of estimating percentage of added water in milk is now beyond question. It is for the purpose of bringing about the practical application of this method within a minimum period of time and at a minimum cost of material so that the method may be reduced to commercial value, my invention has been devised. With these and other objects in view my invention comprises the features of construction and combination of parts as will be hereinafter described and claimed.

The accompanying drawing forming part of this specification is an elevation partly in section of my invention, part of the structure being shown in perspective for the purpose of more clearly illustrating the construction.

In the drawing A indicates a Dewar vacuum vessel, which is incased in an outer insulating receptacle B, having a cap piece C, threaded at 10 thereon so that it can be easily detached when desired. The space between the vacuum vessel and the casing B is filled with an insulating material 11, such as ground cork or any other suitable material. The cap C contains a large centrally perforated insulating body 12 also composed of any suitable insulating material which is held below an insulating ring 13 over the upper end of the vessel A when the cap C is secured on the body of the receptacle. Through the perforation formed by the passage 14 in the insulating body 12, a thin glass testing tube D is inserted downwardly into the chamber within the vacuum vessel, said tube being closely fitted in the body 12 so as to form a tight joint therewith. Arranged within the outer test tube D is an inner test tube E the wall of said inner tube being spaced a short distance from the wall of the outer tube leaving a small space between the two tubes which is preferably filled with alcohol for the purpose of serving to complete the conducting medium between the interior of the apparatus and the sample of milk or other medium to be tested. A tight connection between the inner and outer test tubes is afforded at their upper ends by a narrow section of thin walled rubber tubing 15 or other suitable material. Placed in the upper end of the inner test tube is a sound stopper 16 through which the thermometer F passes with its bulb end extending downwardly to near the lower end of the inner test tube and with its upper end projecting above the apparatus and its scale 17 indicating degrees exposed for observation by the operator. The thermometer together with the shank 18 of a stirring device G are mounted in the stopper 16, said thermometer being held stationary and said stirring device being slidably supported by the stopper. The upper end of the shank 18 above the stopper is provided with a handle 19 by which reciprocating motion is imparted to the stirrer. The lower end of the shank 18 is formed with an annulus 20 which is adapted to surround the body of the thermometer and reciprocate vertically thereabout. This annulus is also formed with radiations 21 for assisting in imparting a stirring action to the liquid to be tested contained in the inner test tube.

The stirrer is preferably made of glass although any other suitable non-conducting material may be employed within the scope of my invention. The insulating body 12 also carries a small inlet tube H for ether, the lower end of which is formed with a lateral perforated ring 22 immediately adjoining the lower end of the outer test tube contained in the vacuum vessel.

A small quantity of sulphuric ether (or other suitable volatile liquid) is placed in the Dewar vacuum vessel sufficient to partly fill the space surrounding the lower end of the pair of test tubes D and E and a steady current of air is delivered by the perforated ring 22 into the volatile liquid, thus vaporizing the ether and cooling the test tubes at a fairly rapid rate. A tube 23 having a branch 24 is adapted to conduct the ether away. A condenser for the ether (not shown) may be connected with the branch 24 to effect greater economy. When thus connected the upper end of tube 23 is closed by a stopper 31. The upper end of the ether inlet tube H may be connected with any suitable source of air pressure, that illustrated having a long stemmed, small caliber air drying tube I and a flask J at one side of the Dewar vacuum chamber, said flask being connected with the tube H by the duct 25 leading into its upper end through the stopper 26 and said drying tube leading upwardly through stopper 26 and its outer end being adapted to be connected with an air pressure bulb (not shown). A small quantity of sulphuric acid or other suitable liquid placed in the flask and its co-operating parts acts to remove moisture from air entering the Dewar vacuum chamber.

A control thermometer K inserted through the body 12 with its bulb immersed in the volatile liquid in the insulating receptacle B is for the purpose of determining when desired the temperature of said liquid and a magnifying glass L movably disposed is adapted to be used for more easily observing the rise and fall of the mercury column in the thermometer F. The magnifying glass is mounted on an arm 27 which is slidably secured to a pivot 28. Said pivot is carried by a sleeve 29. The sleeve is slidable longitudinally on a standard 30 adjoining the receptacle B. The standard 30, receptable B and air injecting flask J are vertically supported in a frame M which may be of any suitable construction to form a support for said parts.

Assuming the size of the apparatus to be approximately double the size of that illustrated by the drawing the procedure should be substantially as follows:—

Insert a long stemmed, small caliber thistle tube into the upper end of tube 23 after removing the stopper 31 and pour into receptacle A ether sufficient to total 200 to 250 cc. which has been previously cooled to 10 deg. C. or lower. Close the tube 23 by reinserting the stopper 31. Next measure into the inner test tube E 25 cc. of boiled distilled water previously cooled to 10 deg. C. or lower. Then insert the thermometer F, stirring device G and stopper 16 into the inner test tube. Lower the test tube E into the larger tube D which is tightly fitted into the apparatus after a sufficient quantity of alcohol to fill the space between the two test tubes has been placed in the outer tube to complete the conducting medium between the interior of the apparatus and the sample to be tested. A steady current of air is maintained through the drying flask J by the air pressure bulb or by other means through the apparatus thereby vaporizing the ether at a fairly rapid rate. The stirring device should be kept in steady up and down motion at a rate of approximately one stroke each two or three seconds or even at a slower rate providing the cooling proceeds satisfactorily. The passage of air is to be maintained through the apparatus until the top of the mercury thread recedes to a point in the neighborhood of the probable freezing point of the water. Continue the manipulation of the stirring device until a super-cooling of from 1 to 1.3 deg. is observed. Usually by this time the liquid will begin to freeze as may be noted by the rapid use of the mercury thread. Manipulate the stirring device slowly and carefully in the meantime until the mercury column reaches its highest point and remains stationary approximately one minute. The operator should observe the exact reading on the thermometer scale and estimate to 0.001 deg. C. After a few minutes time the mercury may begin to recede owing to the cooling effect of the ether in the interior of the apparatus. When the above observation has been completed it is advisable to make a couple of duplicate determinations, then remove the thermometer and stirring device and empty the water from the inner tube. Next rinse out the inner test tube E with 20 to 25 cc. of the sample of milk to be tested, measure into the tube 25 cc. of the milk and insert the tube into the apparatus. In the meantime by inserting a narrow tube into the ether bath, then closing the top end by means of the forefinger and raising to a suitable height, a judgment may be obtained as to whether an additional supply of ether is necessary for the next determination. The determination on the sample of milk, should follow the same procedure as that employed in determining the freezing point of the water. As a rule, however, it is desirable to start the freezing action in the sample of milk by dropping in a small fragment of ice (approximately 0.05 gram) at the time the mercury column has receded to a place about one degree below the probable freezing point. A rapid rise of the mercury column results almost immediately. Manipulate the stirring device slowly and carefully in the meantime until the mercury column reaches its highest point and remains stationary approximately one minute. Observe the exact reading on the thermometer scale and estimate to 0.001 degree. The algebraic difference between the reading obtained on the sample of water and the reading obtained on the sample of milk can then be computed and the freezing point of the milk determined.

By the use of my invention freezing point determinations can be made on milk and other fluids in a fraction of the time heretofore required, thus rendering such determinations practicable in the routine work of a commercial or food controlled laboratory where many tests are to be carried through in the course of a day. The construction of the apparatus is simple, and its operation convenient and efficient in use. The closely fitted test tubes with the narrow intervening distance occupied by a good heat and cold conducting medium provides means for more quickly lowering the temperature of the liquid in the freezing or inner testing tube E. Greater economy is also produced as regards freezing material, i. e., the volatile refrigerating fluid (ether or other suitable liquid), by restricting the volume necessary for a proper charging of the apparatus to the approximate minimum amount necessary in making routine determinations. Shorter time in making the test is produced by the use of the two test tubes assembled and used in the manner stated, their lengths placing the fluid to be frozen remote from the exposed top of the flask B.

In accordance with the patent statutes I have described the principles of operation of my invention together with the apparatus which I now consider to represent the best embodiment thereof, but I desire to have it understood that the construction shown is only illustrative and that the invention can be applied to uses other than those above set forth within the scope of the following claims:

Having described my invention, what I claim as new and desire to protect by Letters Patent is:

1. Apparatus for determining the freezing point of liquids, comprising, in combination, an outwardly insulated flask, a pair of telescoped test tubes having their walls slightly separated and sealed together at their upper ends, the space between being occupied by a good heat and cold conducting medium, said tubes being inserted downwardly into said flask and surrounded by a readily volatile cooling liquid, a thermometer having its bulb inserted into the inner test tube, a stirrer reciprocably disposed in the inner tube, and means for forcing air into the volatile liquid in said flask, said flask being provided with an exhaust duct for the volatile liquid and air, whereby a freezing temperature is quickly conveyed to the contents of the inner tube by a minimum amount of volatile liquid.

2. Apparatus for determining the freezing point of liquid, comprising, in combination, an externally insulated flask, a test tube forming a cell in close proximity to the inner wall of said flask and having its upper end opening outwardly and its lower end surrounded by a readily volatile liquid in the flask, an inner test tube tightly and removably sealed in the outer tube and having its upper end closed and its wall spaced slightly from the wall of the outer tube, the space between said tubes being occupied by a good heat and cold conducting medium, a thermometer inserted in the inner tube for indicating the temperature of the liquid being tested in the inner tube and having its scale outwardly visible and means for forcing air into the volatile liquid and exhausting volatile liquid from said flask, whereby a freezing temperature is quickly conveyed to the contents of the inner tube by a minimum amount of volatile liquid.

3. Apparatus for determining the freezing point of liquid, comprising, in combination, an outwardly insulated flask having a closed inner cell spaced closely from the inner wall of the flask said cell being adapted to hold the liquid to be tested and said flask being adapted to hold a readily volatile liquid, a thermometer inserted in said cell and having its scale outwardly visible, a stirrer reciprocable in said cell and projecting outwardly from the cell to permit reciprocating motion to be imparted to the stirrer, and means for forcing a medium into the volatile liquid adjacent to said cell, whereby a freezing temperature is quickly conveyed to the contents of the cell by a minimum amount of volatile liquid.

4. Apparatus for determining the freezing point of liquids, comprising, in combination, an insulated flask for a volatile cooling fluid, a liquid sample container sealed in said flask, a thermometer arranged to dip into a liquid in the sample container and means to force air into the volatile fluid in the flask, the flask being provided with a vapor outlet, the outer wall of said sample container being in near proximity to the inner wall of the flask to limit the volume of volatile cooling fluid to the minimum necessary amount.

Signed at St. Paul, in the county of Ramsey and State of Minnesota, this 30th day of August, 1919.

JULIUS HORTVET.